June 8, 1926.
C. H. JACKSON
SAFETY ATTACHMENT FOR AUTOMOBILES
Filed Oct. 7, 1925
1,588,372
2 Sheets-Sheet 1
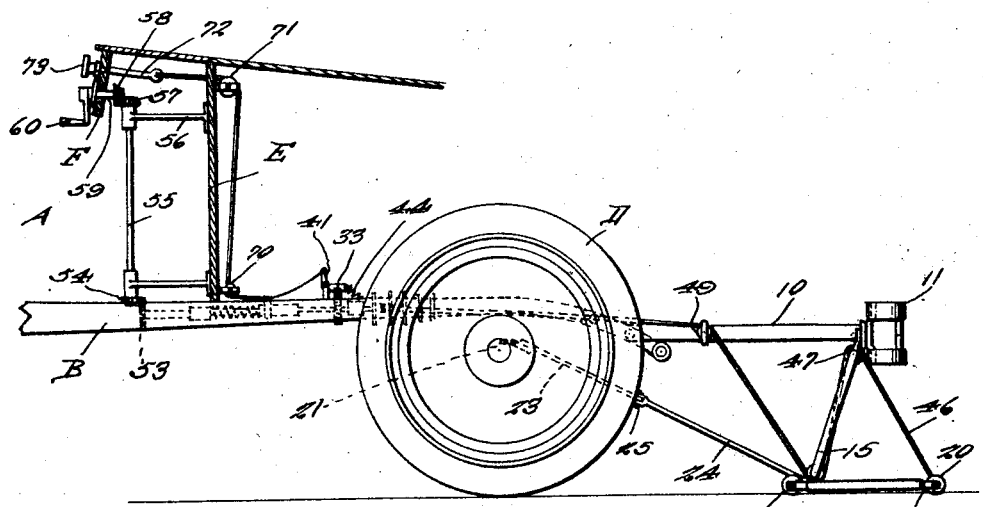
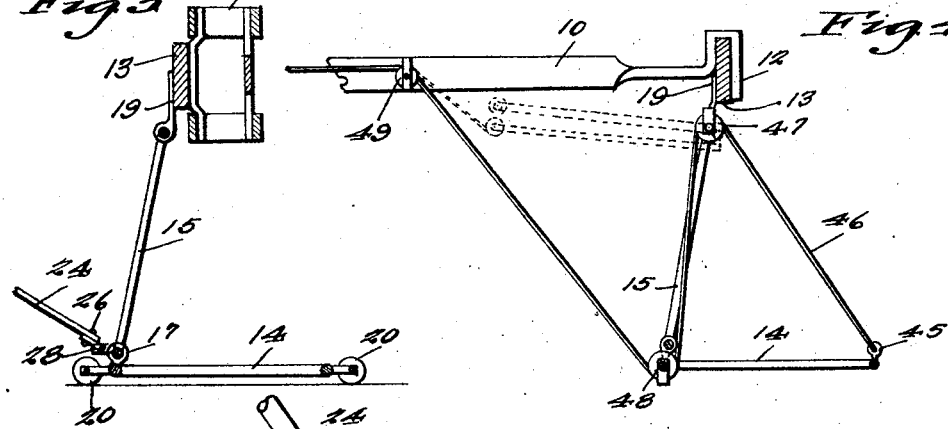
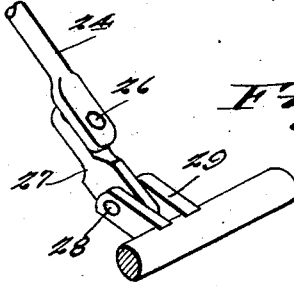
C. H. Jackson INVENTOR June 8, 1926.
C. H. JACKSON
SAFETY ATTACHMENT FOR AUTOMOBILES
Filed Oct. 7, 1925
1,588,372
2 Sheets-Sheet 2
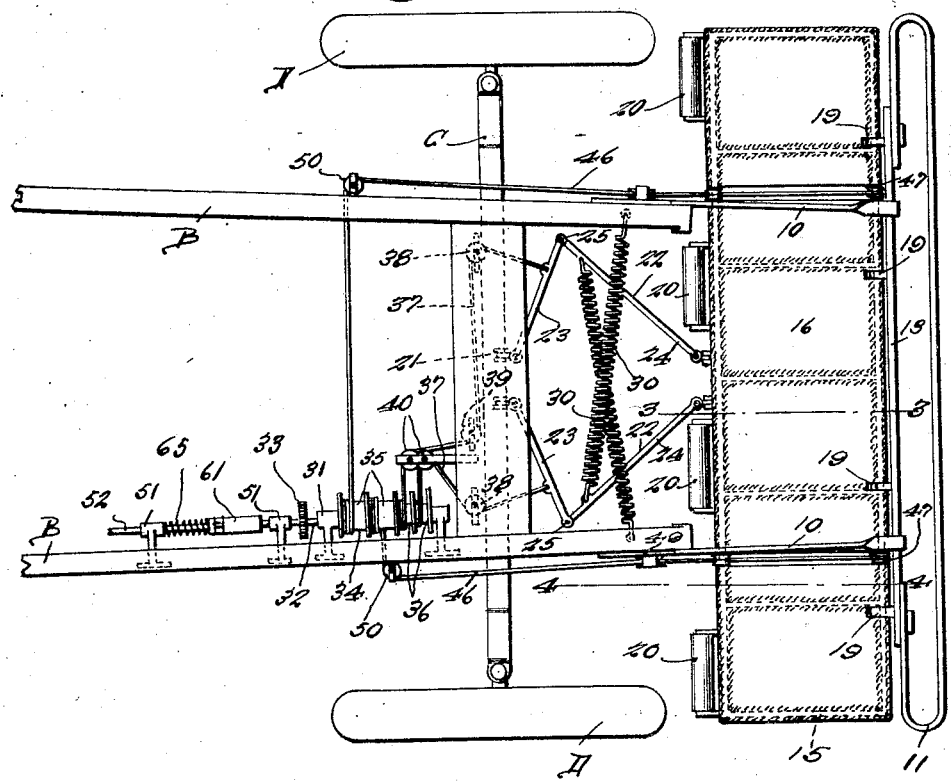
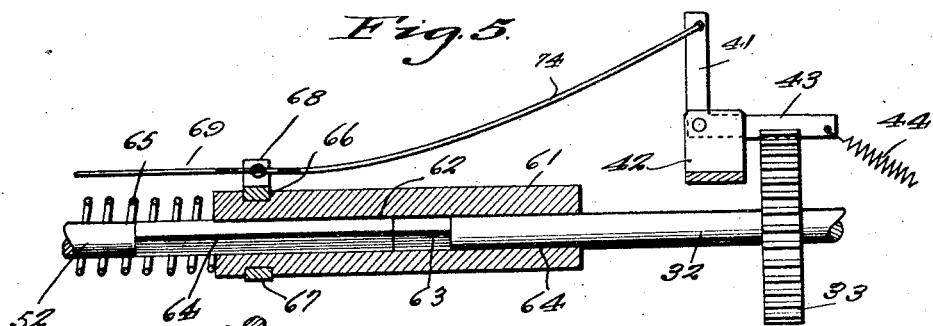

Patented June 8, 1926.

1,588,372

UNITED STATES PATENT OFFICE.

COLEMAN HUBERT JACKSON, OF SOUTH BEND, INDIANA.

SAFETY ATTACHMENT FOR AUTOMOBILES.

Application filed October 7, 1925. Serial No. 61,087.

This invention relates to safety devices for use on automobiles or the like, and has for its object the provision of a novel scoop-like bumper structure mounted in advance of the front wheels and normally arranged in elevated or inoperative position below an ordinary bumper supporting mechanism, means being provided whereby the device may be projected into operative position to form a species of scoop which will catch a pedestrian in case of accident and prevent injury to him.

An important object of the invention is to provide a device of this character provided with spring means whereupon by releasing the holding element the scoop like structure will be projected into its operative position ready for use, it being understood that this is done only when the operator of the vehicle realizes the danger of running into a pedestrian.

Another object of the invention is to provide a device of this character which embodies a rigid bumper acting in the same capacity as those commonly provided and forming a support for the movable scoop like safety device.

Still another object is to provide a device of this character equipped with novel means whereby the parts may be restored to normal or inoperative position after use, ready for repeated use.

An additional object is to provide a mechanism and device of this character which will be comparatively simple and inexpensive in manufacture, easy to install and control, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a side elevation of the device showing it in operative or released position, a portion of the vehicle to which it is attached being shown in section.

Figure 2 is a top plan view of the device.

Figure 3 is a detail cross section taken on substantially the line 3—3 of Figure 2.

Figure 4 is a detail section taken on substantially the line 4—4 of Figure 2, the operative or extended position of the device being shown by full lines and the folded or inoperative position being shown by dotted line.

Figure 5 is a detail sectional view through the releasing mechanism and associated parts.

Figure 6 is a detail perspective view showing the connection of the operating toggle arms with the frame structure, and Figure 7 is a detail view showing the hinge connection of the two frame members.

Referring more particularly to the drawings, the letter A designates a portion of a motor vehicle having the usual frame bars B carrying the front axle C on which are mounted the wheels D. The letter E represents the dash and F indicates the instrument board. All of these parts form no part of the present invention but are illustrated and described for the sake of clearness.

In carrying out the invention, I provide a pair of forwardly extending arms 10 which are bolted or otherwise suitably secured upon the forward portion of the frame bars B and which carry a bumper 11. While the exact manner of mounting is immaterial, it will be noted that the forward ends of the arms 10 may be bent into a substantially inverted U-shape to define a clamp indicated at 12 engaged about the rear bar 13 of the bumper.

The safety device itself comprises a pair of frame members 14 and 15 of any suitable construction but preferably rectangular in shape and covered with canvas or other flexible material indicated at 16. The rear edge of the frame 14 is hingedly or pivotally connected with the lower edge of the frame 15 as for instance by means of upstanding lugs 17 carried by the frame 14 and apertured at 18 for rotatably receiving the lower bar of the frame 15 as clearly indicated in Figure 7. The upper edge of the frame 15 is pivotally suspended from the bumper structure 11 as for instance by means of leaves or knuckle members 19 secured to the rear bar 13 of the bumper and apertured for rotatably receiving the upper bar of the frame 15 as clearly indicated in Figure 3. The lower frame 14 carries a series of suitably journaled rollers 20 mounted at the forward and rear edges thereof and designed to travel upon the surface of the street or road when the device is projected into its operative position as indicated in Figure 1.

Mounted upon the axle are suitable bracket members 21 upon which are pivoted the rear ends of toggle levers 22 each of which includes a pair of links or rods 23 and 24 pivotally connected at 25. The forward ends of the rods or links 24 are pivotally connected at 26 with short members 27 pivoted at 28 between ears 29 projecting rearwardly from the rear bar of the lower frame 14 as clearly indicated in Figure 6. These toggle levers are normally urged into straightened or extended position by means of coil springs 30 which are connected at one end with the sections 24 of the toggle levers and which have their other ends suitably connected with the frame bars of the vehicle.

Mounted upon the vehicle frame at some suitable point are bracket members 31 which constitute bearings for a shaft 32 carrying a gear 33 and a windlass structure designated broadly by the numeral 34. This windlass structure includes two similar drums 35 and two other similar drums 36 suitably secured upon the shaft 32. Connected with the sections 23 of the toggle lever are flexible members such as cables 37 which are trained over guide pulleys 38, 39 and 40 with their ends secured to and wrapped about the drums 36. Obviously, when these drums are rotated so as to wind the flexible members 37 thereonto the toggle levers 22 will be held in their broken or collapsed position as indicated in Figure 2 with the springs under tension. The drum structure is normally prevented from rotation by means of a latch formed as an angle lever 41 pivoted upon a suitable bracket 42 and having one arm 43 engaging the gear 33, a spring 44 being connected with this arm for normally holding it in engagement with the gear. The action of the latch device and the release thereof will be hereinafter explained.

Connected with the forward edge of the lower frame 14, as shown at 45, are flexible members or cables 46 which extend upwardly over guide pulleys 47 carried by the rear bar 13 of the bumper. From this point the flexible members extend downwardly beneath pulleys 48 mounted at the rear of the frame 14 and then upwardly over guide pulleys 49 on the arms 10, then over guide pulleys 50 on the frame bars B. The other ends of these flexible members are secured to and wrapped about the drums 35 and it will be obvious that when the drums are rotated by means to be described, the winding of the flexible members 46 thereonto will draw or swing the frame members 14 and 15 substantially into engagement and into substantially horizontal position as indicated by dotted lines in Figure 4.

Journally mounted in suitable bearings 51 on the frame bar at one side of the vehicle is a shaft 52 carrying a bevel gear 53 with which meshes a bevel gear 54 on the lower end of a vertical shaft 55 journaled in brackets 56 projecting rearwardly from the dash E. The upper end of the shaft 55 carries a bevel gear 57 with which meshes a bevel gear 58 on a short shaft 59 journaled through the instrument board F and equipped with a crank handle 60. Obviously, by rotating the crank handle the shaft 52 will be driven. The shaft 52 is arranged in alinement with the shaft 32 and is clutched thereto by means of a longitudinally shiftable sleeve 61 having a squared or other angularly shaped socket 62 therein slidably engaged upon the squared end portions 63 and 64 of the shafts 32 and 52 respectively. The sleeve 61 has a bore 64 therein which is smooth and circular in cross section and which when in position opposite the squared portion of the shaft 32 will permit rotation thereof with respect thereto. Normally, the sleeve 61 is held at one limit of its movement by a coil spring 65 which engages against the rear end of the sleeve and against the rear bracket 51. This sleeve 61 is formed with a peripheral groove 66 within which is engaged a shifting collar 67 having ears 68 thereon connected with a flexible member 69 which is trained about guide pulleys 70 and 71 on the front side of the dash E and which is connected with the forward end of a pull rod 72 slidably mounted through the instrument board and equipped with a handle 73. The flexible member 69 is also connected with the angle lever 41, this particular portion of the flexible member being indicated by the numeral 74 and normally lying flat as clearly indicated in Figure 5.

In the operation of the device, it will be seen that to set the parts the crank handle 60 is rotated to turn the shaft 52 and as this shaft 52 is normally clutched to the shaft 32 by means of the sleeve 61 the drum structure 34 will be rotated and the cables or other flexible members 37 and 46 will be wrapped about the drum members 36 and 35 respectively. When this is done, the latch 43 is then engaged with the gear 33 to prevent further rotation of the drum structure and the frames 14 and 15 will be in their elevated and substantially horizontal position as shown by dotted lines in Figure 4. At the same time, the toggle members 22 will be broken with the springs 30 under tension as clearly indicated in Figure 2.

When the operator sees that there is any danger of striking a pedestrian, to effect release of the safety device it is merely necessary that he grasps the handle 73 and pull the plunger 72 rearwardly. When this is done, the pull applied to the flexible member 69 will first move the collar 57 rearwardly, drawing the sleeve 61 with it until the bore 64 thereof comes opposite the squared portion 63 of the shaft 32, thus breaking the drive connection between the shafts 52 and 32. As soon as this has been accomplished the slack portion 74 of the flexible members 69 will become taut and will operate to rock the angle lever 41 upon its pivot so that the arm 43 will be disengaged from the gear 33. The springs 30 connected with the toggle members 32 will then operate to straighten out the sections thereof and this will naturally apply a strong pull to the flexible members 37. As these members are trained about and wrapped upon the drum members 36 it is quite obvious that the entire drum structure including the drum members 35 will be rotated, thus relieving the tension of unwinding the flexible members 46. The result is that the frame members 14 and 15 will be drawn forwardly and downwardly into their extended position as shown in Figure 1, with the rollers 20 engaging and rising upon the surface of the ground. The cables or flexible members 46 not only perform this action but serve to guide the frame members into their proper position. Obviously, the straightening of the toggle levers 22 will force the frame members into this position and as soon as they have become entirely straightened will act to brace and stiffen the structure so as to withstand the impact of a person falling upon the frame members. However, in view of the fact that these frame members are covered with canvas it is obvious that a person struck will be caught up and be carried along instead of falling beneath the wheels and being probably seriously injured. After actuation, in order to effect return of the parts to normal position, it is merely necessary that the operator grasp the crank handle 60 and turn it so as to rewind the cables 36 upon the drum members in order to again break the toggle levers 22 and place the springs 30 under tension. This drawing back or folding of the toggle members will of course draw the frame members 14 and 15 into their normal or folded position, the flexible members 46 being accommodated by the drum likewise.

From the foregoing description and a study of the drawings, it will be apparent that I have provided a simply constructed, comparatively inexpensive and easily installed safety device which will be a great safeguard to the walking public inasmuch as a pedestrian struck will be caught up and carried along instead of being run over. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim :—

1. In an apparatus of the character described, supporting arms adapted to be mounted upon the frame bars of a vehicle, a rigid bumper structure carried by said arms, a frame member pivotally suspended from said bumper structure, a second frame member hingedly mounted upon the lower edge of said first named member, both of said frame members being covered with flexible material, catch means normally holding said frame members in rearwardly swung elevated position, and means for releasing said catch means for moving the frame members to lowered and extended position.

2. In a device of the character described, a stationary bumper structure mounted upon a vehicle, a pair of pivotally connected flexible material covered frames suspended from said rigid bumper structure, flexible members connected with one of the frames, means for moving said flexible members to swing the frames into extended position, toggle members connected with the vehicle frame and with one of said frames, spring means normally tending to straighten the toggle members for projecting said frames into operative position, latch means normally holding said spring means inoperative, and means for releasing the latch means.

3. In a device of the character described, a rigid bumper structure, a frame suspended therefrom, a second frame hingedly connected with the first named frame, both of said frames being covered with flexible material, a windlass structure, flexible members connected with the forward edge of the second named frame, trained about guide pulleys and secured to and wrapped about portions of said windlass structure, toggle levers pivotally connected with the said named frame, spring means normally tending to straighten the toggle members, other flexible members connected with said toggle levers, trained about guide pulleys and secured to and wrapped about other portions of the windlass, means normally holding the windlass stationary, means for releasing said holding means, and means for effecting rotation of the windlass.

4. In a device of the character described, a rigid bumper structure, a frame suspended therefrom, a second frame pivotally connected with the first named frame, both frames being covered with flexible material, spring pressed toggle means normally tending to urge said frames into extended position, flexible members connected with the second named frame for moving the frames into inoperative position, flexible members connected with the toggle levers, and means for applying tension to the flexible members.

In testimony whereof I affix my signature.

COLEMAN HUBERT JACKSON.